United States Patent
Lee et al.

(10) Patent No.: US 8,494,716 B1
(45) Date of Patent: Jul. 23, 2013

(54) LANE KEEPING SYSTEM USING REAR CAMERA

(75) Inventors: Jin-Woo Lee, Roochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/487,303

(22) Filed: Jun. 4, 2012

(51) Int. Cl.
    *A01B 69/00* (2006.01)
(52) U.S. Cl.
    USPC ............... 701/41; 701/96; 701/301; 382/103
(58) Field of Classification Search
    USPC ............ 701/23, 41, 44, 93, 96, 301; 382/103, 382/276
    See application file for complete search history.

(56) References Cited

U.S. PATENT DOCUMENTS

| | | | | |
|---|---|---|---|---|
| 6,256,561 | B1 * | 7/2001 | Asanuma | 701/41 |
| 7,216,023 | B2 * | 5/2007 | Akita | 701/41 |
| 8,346,436 | B2 * | 1/2013 | Yokoyama et al. | 701/41 |
| 8,385,600 | B2 * | 2/2013 | Nara et al. | 382/104 |
| 2003/0045983 | A1 * | 3/2003 | Kondo et al. | 701/41 |
| 2005/0027415 | A1 * | 2/2005 | Iwazaki et al. | 701/36 |
| 2006/0030987 | A1 * | 2/2006 | Akita | 701/41 |
| 2009/0319113 | A1 | 12/2009 | Lee | |
| 2010/0114431 | A1 * | 5/2010 | Switkes et al. | 701/41 |
| 2010/0209892 | A1 * | 8/2010 | Lin et al. | 434/71 |
| 2010/0211270 | A1 * | 8/2010 | Chin et al. | 701/44 |
| 2010/0228420 | A1 | 9/2010 | Lee | |
| 2012/0010808 | A1 * | 1/2012 | Yokoyama et al. | 701/301 |
| 2012/0314070 | A1 * | 12/2012 | Zhang et al. | 348/148 |

* cited by examiner

*Primary Examiner* — Helal A Algahaim

(57) ABSTRACT

Method for controlling a vehicle to maintain a desired position on a roadway includes monitoring roadway information behind the vehicle using a rearward detection device and monitoring vehicle sensor information. Frontward positional information is projected based on rearward positional information obtained from the monitored roadway information behind the vehicle. Forward roadway curvature is estimated based on the vehicle sensor information. Roadway information ahead of the vehicle is modeled based on the projected frontward positional information and the estimated forward roadway curvature to determine desired vehicle positional information. Future vehicle positional information is predicted with respect to the modeled roadway information based on the monitored vehicle sensor information and the estimated forward roadway curvature. The desired vehicle position information is compared to the predicted future vehicle positional information and a steering command is generated based on a deviation in the predicted future position information from the desired vehicle positional information.

19 Claims, 6 Drawing Sheets

LANE KEEPING SYSTEM USING REAR CAMERA

TECHNICAL FIELD

This disclosure is related to autonomous and semi-autonomous driving vehicles.

BACKGROUND

The statements in this section merely provide background information related to the present disclosure. Accordingly, such statements are not intended to constitute an admission of prior art.

Autonomous and semi-autonomous driving vehicles are able to provide driving control with minimal or no driver intervention. Cruise control systems allow the vehicle operator to set a particular speed for the vehicle, and the cruise control system will maintain the set speed without the driver operating the throttle. Adaptive cruise control systems maintain the set speed, but also will automatically slow the vehicle down in the event that a slower moving preceding vehicle is detected using various sensors, such as radar and cameras. Certain vehicles also provide autonomous parking where the vehicle will automatically provide hand-off steering control for parking the vehicle.

It is known to maintain a vehicle near the center of a lane on the road based on modeling a roadway ahead of the vehicle utilizing a vision system capturing images of the roadway ahead of the vehicle. Few vehicles are equipped with a vision system for capturing images of the roadway in front of the vehicle. However, rearward cameras for capturing images behind the vehicle are becoming more common, for example to provide additional driver information for back-up enhancement.

SUMMARY

Method for controlling a vehicle to maintain a desired position on a roadway includes monitoring roadway information behind the vehicle using a rearward detection device and monitoring vehicle sensor information. Frontward positional information is projected based on rearward positional information obtained from the monitored roadway information behind the vehicle. Forward roadway curvature is estimated based on the vehicle sensor information. Roadway information ahead of the vehicle is modeled based on the projected frontward positional information and the estimated forward roadway curvature to determine desired vehicle positional information. Future vehicle positional information is predicted with respect to the modeled roadway information based on the monitored vehicle sensor information and the estimated forward roadway curvature. The desired vehicle position information is compared to the predicted future vehicle positional information and a steering command is generated based on a deviation in the predicted future position information from the desired vehicle positional information.

BRIEF DESCRIPTION OF THE DRAWINGS

One or more embodiments will now be described, by way of example, with reference to the accompanying drawings, in which.

DETAILED DESCRIPTION

Figure 1:
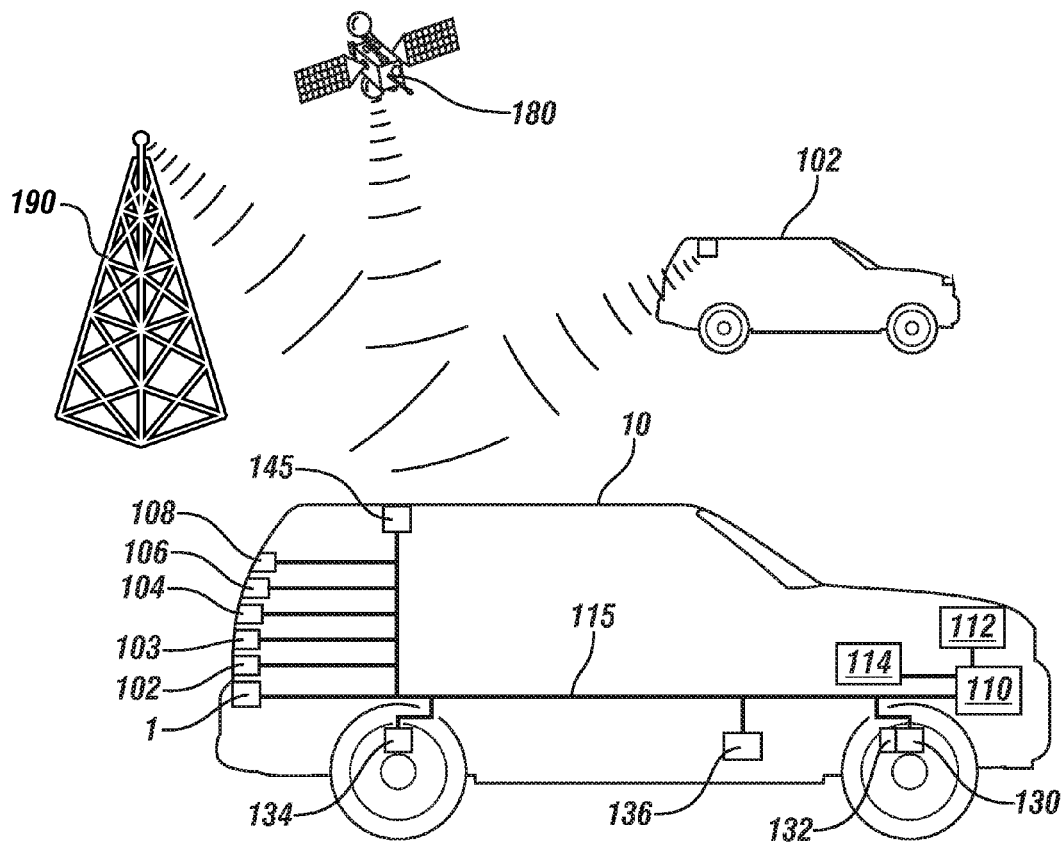
FIG. 1 illustrates an exemplary vehicle equipped with a lane keeping system, in accordance with the present disclosure.

Referring now to the drawings, wherein the showings are for the purpose of illustrating certain exemplary embodiments only and not for the purpose of limiting the same, FIG. 1 illustrates an autonomous or semi-autonomous vehicle 10 equipped with a lane keeping system, in accordance with the present disclosure. Vehicle 10 includes a lane keeping system manager 110; a steering system 112; a braking and torque differential system 114; rearward detection devices for monitoring roadway information behind the vehicle 10, including a rearward camera 1, a rearward lidar device 102, a rearward radar device 103, a rearward laser device 104; a vehicle-to-vehicle information transceiver 106; a vehicle-to-infrastructure information receiver 108; vehicle information sensors, including vehicle speed sensor 130, frontward steering angle sensor 132, rearward steering angle sensor 134, a yaw rate sensor 136; and a GPS device 145. The lane keeping system manager 110 includes a lane keeping controller 200 (see FIG. 2) and a programmable processor including programming to monitor various inputs and determine what vehicle sensor information and what monitored roadway information behind the vehicle is appropriate for maintaining a desired vehicle position on a roadway. The lane keeping system manager 100 can communicate directly with various systems and devices, or the lane keeping system manager 110 can communicate over a LAN/CAN system 115. The rearward camera 1 is an image capturing device taking periodic or sequential images representing a view behind the vehicle 10. The rearward lidar device 102 includes a device known in the art that can measure the distance to, or other properties of roadway information behind the vehicle, by illuminating the roadway information behind the vehicle with light. The rearward radar device 103 includes a device known in the art utilizing electromagnetic radiation to detect roadway information behind the vehicle. The rearward laser device 104 includes a device known in the art that can measure the distance to roadway information behind the vehicle, by using pulses of microwaves or radio waves projected to the target behind the vehicle. The vehicle-to-vehicle information transceiver 106 can communicate with other vehicles 102 on a roadway for monitoring roadway information behind the vehicle. The vehicle-to-infrastructure receiver 108 can receive monitored roadway information transmitted from infrastructure transmitters 190 located along a roadway. The exemplary vehicle speed sensor 130, frontward steering angle sensor 132, rearward steering angle sensor 134 and yaw rate sensor 136 are depicted to represent such vehicle information sensors describing vehicle operation, including vehicle motion parameters, but the disclosure intends to include any such sensors for use by the lane keeping system. GPS device 145 is a device known in the art for communicating with resources outside of the vehicle, for example, satellite system 180. The GPS device 145 may be utilized in conjunction with a 3D map database including detailed information relating to a global coordinate received by the GPS device 145 regarding the current location of the vehicle and tracking previously traversed GPS information. The GPS device 145 in conjunction with the 3D map database can also function as a rearward detection device for monitoring road information behind the vehicle. The steering system 112 can be utilized to autonomously control the vehicle based on a steering command to maintain the desired vehicle position along a roadway. The torque and braking differential system 114 can also be utilized to autonomously control the vehicle based on the steering command to maintain the desired vehicle position along a roadway.

Accordingly, the lane keeping system manager 110 can determine if lane keeping is currently disengaged and if roadway information is capable of being monitored (i.e., is a rearward detection device available). The lane keeping system manager 110 can determine if the steering system 112 and/or the torque and braking differential system 114 can accept the steering command to autonomously control the vehicle to maintain the desired vehicle position along the roadway. The lane keeping system manager 110 can engage the lane keeping system.

Figure 2:
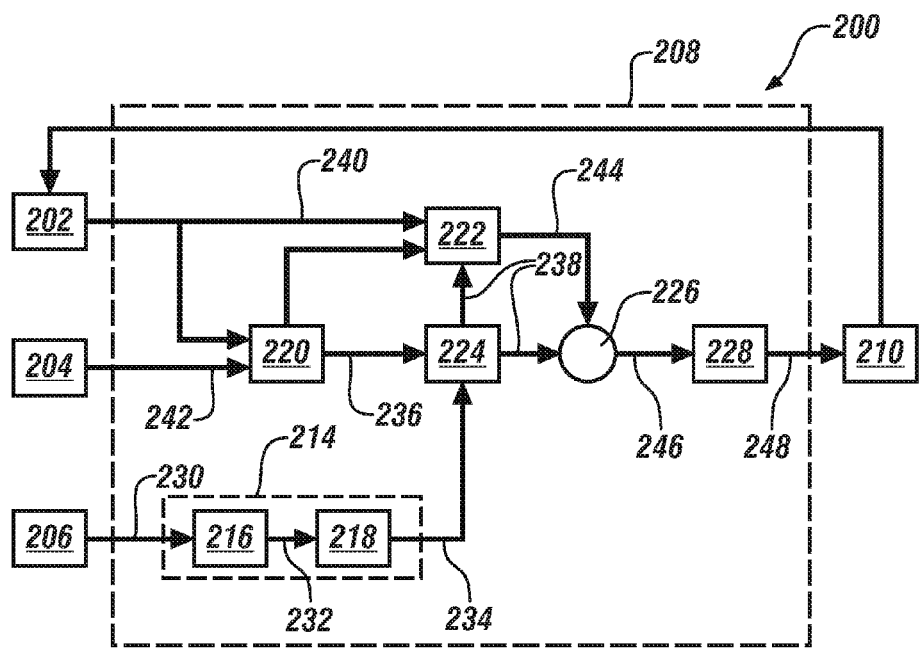
FIG. 2 illustrates a lane keeping controller for controlling an autonomous or semi-autonomous vehicle to maintain a desired position on a roadway, in accordance with the present disclosure.

FIG. 2 illustrates a schematic block diagram of a lane keeping controller (LKC) 200 for providing control for lane keeping an autonomous or semi-autonomous vehicle, such as vehicle 10 shown in FIG. 1, in accordance with the present disclosure. The LKC 200 can be integrated within the lane keeping system manager 110. The LKC 200 includes a vehicle sensor module 202, a GPS module 204, a rearward detection device module 206, a lane keeping control module 208 and a steering module 210. The lane keeping module 208 includes a frontward positional information module 214, a forward roadway curvature module 220 a predicted positional information module 222, a desired positional information module 224, a comparison unit 226 and a steering command module 228. The frontward positional information module 214 further includes a rearward positional information module 216 and a geometric delay compensation module 218.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The rearward detection device module 206 includes a rearward detection device, such as the rearward camera 1 of FIG. 1. The rearward detection device can further include at least one of a rearward camera, a rearward lidar device, a rearward laser device, vehicle-to-vehicle information and vehicle-to-infrastructure information. The roadway information 230 behind the vehicle can be monitored by fusing information obtained by more than one of the rearward detection devices utilizing methods known in the art. The roadway information 230 behind the vehicle can be monitored utilizing one rearward detection device, such as the rearward camera 1. For simplicity, a rearward camera will be used interchangeably with the rearward detection device throughout the disclosure. The rearward detection device monitors roadway information 230 behind the vehicle. The monitored roadway information can be provided to the rearward positional information module 216 of the positional information module 214. The monitored roadway information can include roadway edges, roadway shoulders and roadway lane markings. In an exemplary embodiment, the monitored roadway information behind the vehicle includes a right edge lane marking and a left edge lane marking. The positional information module 214 projects frontward positional information 234 based on rearward positional information 232 obtained from the monitored roadway information 230 behind the vehicle.

Figure 3:
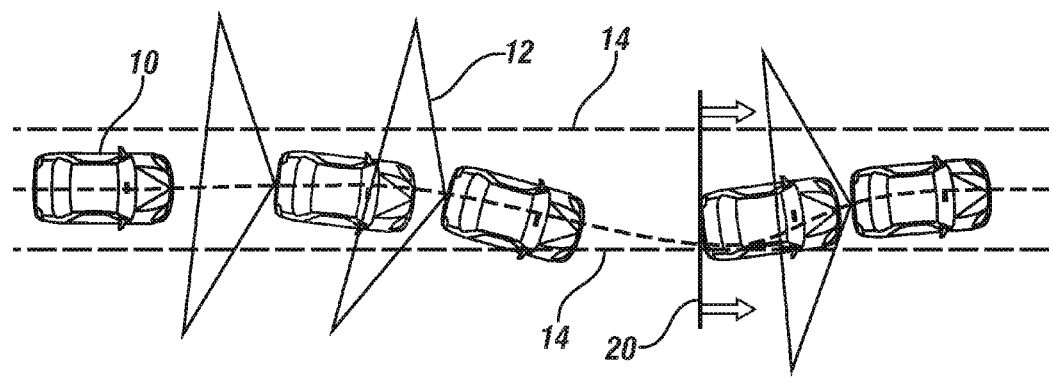
FIG. 3 illustrates the vehicle of FIG. 1 travelling along a roadway, in accordance with the present disclosure.

FIG. 3 graphically illustrates the vehicle 10 of FIG. 1 travelling along a roadway. The rearward camera 1 positioned proximate the rear end of the vehicle has a viewing angle 12 for encompassing lane markings 14 (e.g., left and right edge lane markings) behind the vehicle. When the vehicle is predicted to be positioned outside of the lane markings 14, as denoted by vertical line 20, a steering command can be generated to autonomously control the vehicle back to a lane center (i.e., a desired vehicle position) between the lane markings 14.

Figure 4:
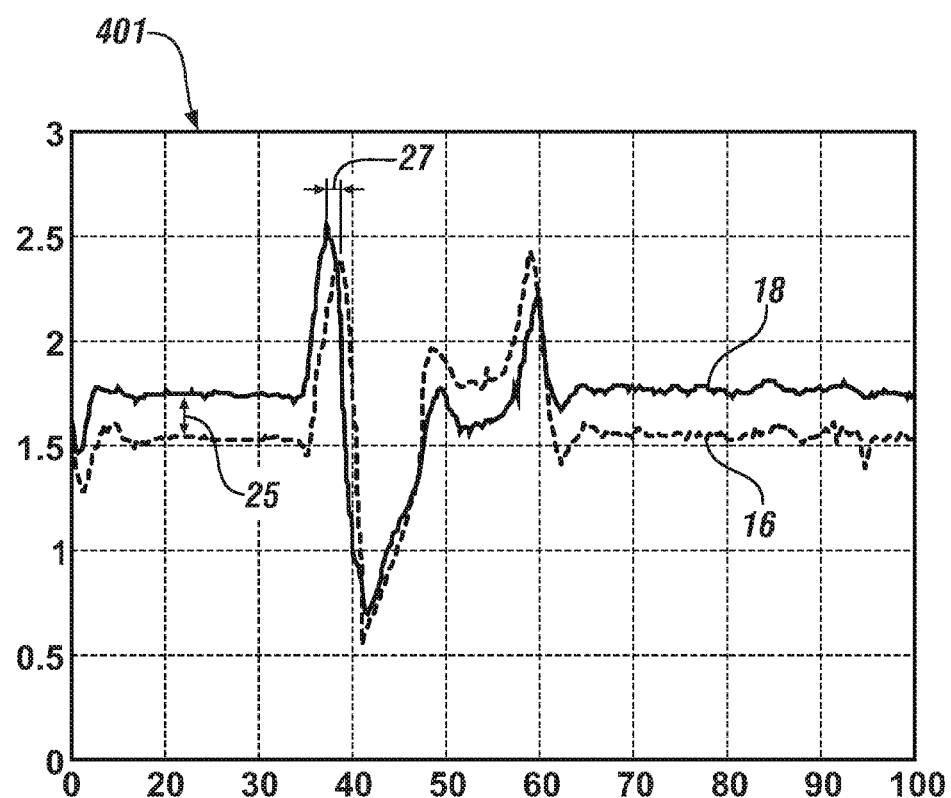
FIG. 4 illustrates a plot comparing a rearward view range of a rearward camera monitoring vehicle information behind the vehicle and a frontward view range of a frontward camera monitoring vehicle information ahead of the vehicle, in accordance with the present disclosure.
Figure 5:
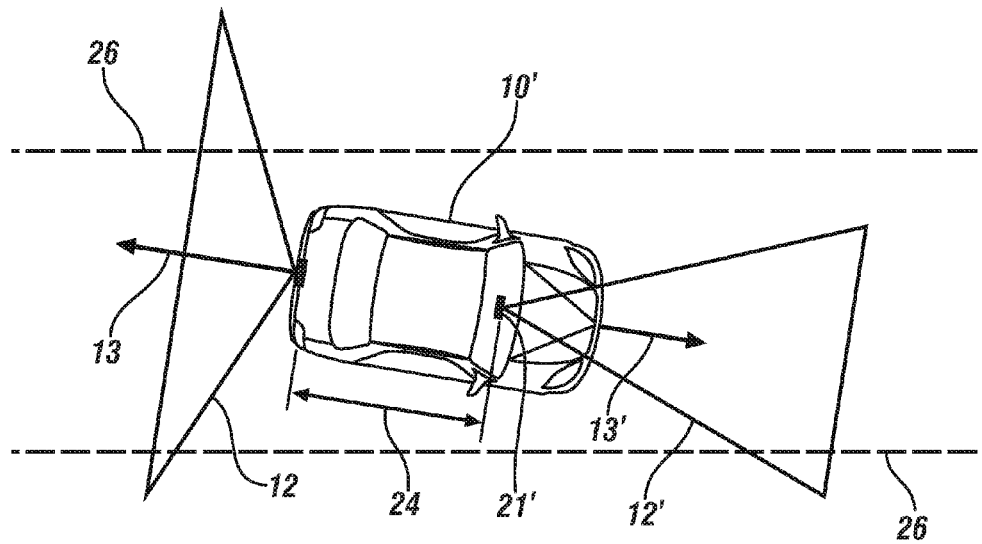
FIG. 5 illustrates a vehicle equipped with both frontward and rearward cameras, in accordance with the present disclosure.

The plot 401 of FIG. 4 illustrates comparing a rearward view range 16 of a rearward camera monitoring roadway information, such as positional information of lane markings with respect to the vehicle, behind the vehicle (e.g., rearward roadway information) and a frontward view range 18 of a frontward camera monitoring roadway information, such as positional information of lane markings with respect to the vehicle, ahead of the vehicle (e.g., frontward roadway information). The horizontal-axis denotes time in seconds and the vertical-axis denotes a vehicle lateral offset from the lane markings on the left side of the vehicle in meters. FIG. 5 illustrates a vehicle 10' equipped with both frontward and rearward cameras 21', 21, respectively. However, FIG. 5 is only illustrated as a performance comparison for the purpose of comparing roadway information monitored behind the vehicle using the rearward camera 21 and roadway information monitored ahead of the vehicle using the frontward camera 21'. It will be appreciated that embodiments discussed herein will be directed toward vehicles only equipped with rearward detection device, e.g., a rearward camera 21. The frontward camera 21' can monitor roadway information, such as lane markings 26, ahead of the vehicle 10'. The frontward camera 21' has a forward view range in a first direction 13' and corresponding forward view angle 12'. The rearward camera 21 can monitor roadway information, such as lane markings 26, behind the vehicle 10'. The rearward camera 21 has a rearward view range in a second direction 13 and corresponding rearward view angle 12. The rearward camera 21 is located a distance 24 behind the frontward camera 21'. In one embodiment, the distance 24 is three (3) meters. Due to variation in view angles between the frontward and rearward cameras, the monitored roadway information ahead of the vehicle using the frontward camera 21' can be closer or further than the monitored roadway information behind the vehicle using the rearward camera 21. Similarly, the view angle of rearward camera can be wider than the view angle of the frontward camera. This observance between the frontward and rearward cameras 21', 21, respectively, can be referred to as a geometric delay. Referring back to FIG. 4, the plot 401 illustrates an offset range 25 depicting a deviation in the distance to monitored roadway information (i.e., lane markings 26) using the rearward camera 21 and using the frontward camera 21'. The offset range 25 can result due to the rearward view angle 12 of the rearward camera 21 being wider than the forward view angle 12' of the frontward camera 21'. In this example, monitored roadway information ahead of the vehicle using the frontward camera 21' is further than the monitored roadway information behind the vehicle using the rearward camera 21. Further, due to the distance 24 the rearward camera 21 is located behind the frontward camera 21', the monitored roadway information behind the vehicle using the rearward camera 21 is measured after the monitored roadway information ahead of the vehicle using the frontward camera 21'. A measurement delay 27 illustrates the monitored roadway information behind the vehicle being monitored after the monitored roadway information ahead of the vehicle. Therefore, geometric delay, such as the offset range 25 and the measurement delay 27, must be taken into consideration when roadway information is monitored exclusively by a rearward camera. It will be appreciated that roadway information can be monitored behind the vehicle exclusively by a rearward camera on vehicles only equipped with a rearward camera or in situations where a vehicle is equipped with both frontward and rearward cameras, but the frontward camera is inoperative due to failure or other circumstances.

Figure 6:
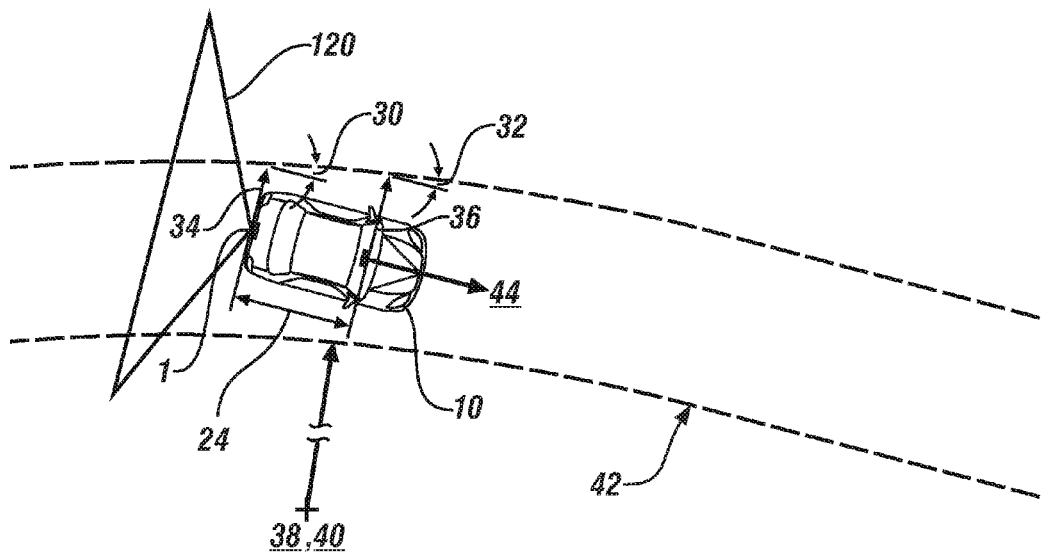
FIGS. 6-8 illustrate the vehicle of FIG. 1 travelling on a roadway, associating positional information of the vehicle with respect to the roadway, in accordance with the present disclosure.
Figure 7:
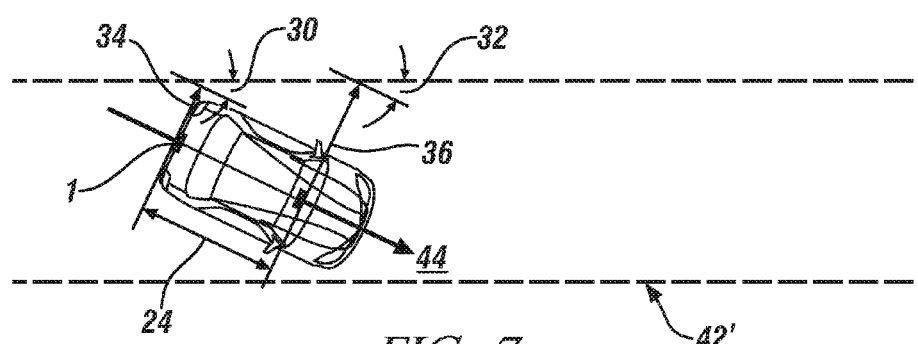
Figure 8:
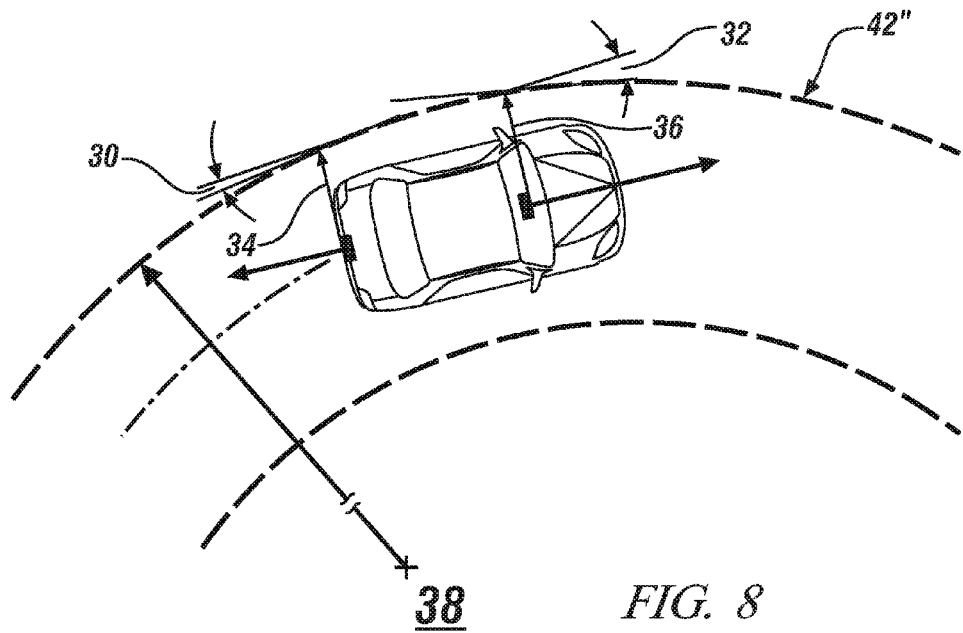

FIGS. 6-8 illustrate a vehicle travelling on a roadway, such as vehicle 10 of FIG. 1, associating positional information of the vehicle with respect to the roadway, in accordance with the present disclosure. Roadway information is monitored within a rearward view angle 120 behind the vehicle using a rearward detection device, such as rearward camera 1 of FIG. 1. In an exemplary embodiment, the monitored roadway information behind the vehicle can include a left edge lane marking of a roadway lane behind the vehicle and a right edge lane marking of the roadway lane behind the vehicle. Table 1 is provided as a key to FIGS. 6-8 wherein numerically labeled positional information and the corresponding symbols and/or descriptions are set forth as follows.

TABLE 1

| MEASUREMENT | MEASUREMENT DESCRIPTION |
|---|---|
| 120 | Rearward view angle. |
| 24 | L - longitudinal offset of the rearward detection device from a vehicle center. |
| 30 | $\theta_r$ - vehicle rearward heading angle. |
| 32 | $\theta_f$ - vehicle frontward heading angle. |
| 34 | $y_{lr}$ - vehicle rearward lateral offset. |
| 36 | $y_{lf}$ - vehicle frontward lateral offset. |

TABLE 1-continued

| MEASUREMENT | MEASUREMENT DESCRIPTION |
|---|---|
| 38 | $\rho$ - estimated forward roadway curvature. |
| 40 | $\Delta\rho$ - estimated forward roadway curvature derivative. |
| 42 | y(x) - modeled roadway calculated using Eq. [1]. |
| 44 | X - vehicle longitudinal axis. |

With reference to FIGS. 2 and 6-8, the rearward positional information module 216 receives the monitored roadway information 230 behind the vehicle from the rearward detection device module 206. The rearward positional information module 206 obtains the rearward positional information 232 from the monitored roadway information 230 behind the vehicle. The obtained rearward positional information 232 can include a vehicle rearward lateral offset $y_{lr}$ 34 from the monitored roadway information and a vehicle rearward heading angle $\theta_r$ 30 with respect to the monitored roadway information behind the vehicle (i.e., a roadway edge or lane marking). It will be appreciated that although only the vehicle rearward lateral offset $y_{lr}$ 34 and the vehicle rearward heading angle $\theta_r$ 30 obtained for the left side of the vehicle 10 are illustrated in FIGS. 6-8, the rearward positional information 232 can further include a vehicle rearward lateral offset and a vehicle rearward heading angle obtained for the right side of the vehicle 10. The rearward positional information 232 is input to a geometric delay compensation module 218.

As aforementioned, due to the rearward camera 1 being positioned proximate a rear end of the vehicle and having a wide rearward view angle 120, geometric delay must be compensated for in order to project the frontward positional information 234. The geometric delay compensation module 218 applies geometric relationships to the obtained rearward positional information 232 including $y_{lr}$ 34 and $\theta_r$ 30 to compensate for the geometric delay and thereby project frontward positional information 234. The frontward positional information 234 can include a vehicle frontward lateral offset $y_{lf}$ 36 from forward roadway information (e.g., roadway edge or lane marking) and a vehicle frontward heading angle $\theta_f$ 32 with respect to the forward roadway information (e.g., a roadway edge or lane marking) on a left side of the vehicle (e.g., a left edge lane marking). The frontward roadway information is merely roadway information projected forward to a location, L 24, proximate the vehicle center from the roadway information behind the vehicle. It will be appreciated that the frontward positional information 234 can further include a frontward lateral offset from forward roadway information and a vehicle frontward heading angle with respect to the forward roadway information on a right side of the vehicle (e.g., a right edge lane marking).

FIG. 7 illustrates a straight roadway 42'. Hence, the monitored roadway information 230 using the rearward camera 1 indicates no roadway curvature. In an exemplary embodiment, the $\theta_f$ 32 and $y_{lf}$ 36 can be projected for a straight roadway by applying geometric relationships to the obtained rearward positional information as follows:

$$\theta_f = \theta_r \quad [1]$$

$$y_{lf} = \tan(\theta_r) \cdot L + y_{lr} \quad [2]$$

wherein L is the longitudinal offset of the rearward camera from the vehicle center.

It will be appreciated that while the vehicle 10 may not include a frontward camera, or may not be currently utilizing one, the vehicle center location can correspond to a location at which the frontward camera would be located.

Hence, when the monitored roadway information 230 behind the vehicle indicates no roadway curvature, Equation [2] demonstrates that $y_{lf}$ 36 is based on a tangent of $\theta_r$ 30, L and $y_{lr}$ 34. Equation [1] demonstrates that $\theta_f$ 32 is equal to $\theta_r$ 30.

FIG. 8 illustrates a curved roadway 42". Hence, the monitored roadway information 230 using the rearward camera 1 indicates roadway curvature. In an exemplary embodiment, the $\theta_f$ 32 and $y_{lf}$ 36 can be projected for a curved roadway by applying geometric relationships to the obtained rearward positional information 232 as follows:

$$\tan(\theta_f) = \tan(\theta_r) - L \cdot \rho \quad [3]$$

$$y_{lf} = \rho/2 \cdot L^2 - \tan(\theta_r) \cdot L + y_{lr} \quad [4]$$

wherein $\rho$ is an estimated forward roadway curvature 38.

Hence, when the monitored roadway information behind the vehicle indicates roadway curvature, Equation [4] demonstrates that $y_{lf}$ 36 is based on a tangent of $\theta_r$ 30, L, $\rho$ 38 and $y_{lr}$ 34. Equation [3] demonstrates that $\theta_f$ 32 is based on $\theta_r$ 30, a cotangent of L and a cotangent of $\rho$ 38.

Therefore Equations [1]-[4] express that the projected frontward positional information 234 including vehicle frontward lateral offset $y_{lf}$ 36 from the frontward roadway information and vehicle frontward heading angle $\theta_f$ 32 with respect to the frontward roadway information are based on geometric relationships applied to the obtained vehicle rearward lateral offset $y_{lr}$ 34 from the monitored roadway information behind the vehicle and vehicle rearward heading angle $\theta_r$ 30 with respect to the monitored roadway information behind the vehicle. The projected frontward positional information 234 is input to the desired positional information module 224.

The desired positional information module 224 receives the projected frontward positional information 234 and estimated forward roadway curvature information 236 that can include an estimated forward roadway curvature $\rho$ 38 and an estimated forward roadway curvature derivative $\Delta\rho$ 40 shown in FIG. 6. The estimated forward roadway curvature information 236 is estimated by the forward roadway curvature module 220, and will be discussed in greater detail below. The desired positional information module 224 models roadway information ahead of the vehicle based on the projected frontward positional information 234 and the estimated forward roadway curvature information 236 to determine desired vehicle positional information 238 with respect to the modeled roadway information ahead of the vehicle. The desired positional information module 224 can model the roadway information 238 ahead of the vehicle utilizing a third order polynomial equation as follows.

$$y(x) = Ax^3 + Bx^2 + Cx + D \quad [5]$$

The coefficients of Eq. [5] can be expressed as follows:

$$A = \frac{\Delta\rho}{6} \quad [6]$$

$$B = \frac{\rho}{2}$$

$$C = \tan(\theta_f)$$

$$D = y_{lf}$$

wherein $\Delta\rho$ is the forward roadway curvature derivative 40, $\rho$ is the forward roadway curvature 38, $\theta_f$ is the vehicle front heading angle with respect to frontward roadway information 32, and $y_{lf}$ is the vehicle front lateral offset 36 from the frontward roadway information 36.

Substituting Equations [1] and [2] into Equation [5] provides a roadway model for a straight roadway having no roadway curvature as follows.

$$y(x) = \tan(\theta_r) \cdot x + \tan(\theta_r) \cdot L + y_{lr} \quad [7]$$

And, substituting Equations [3] and [4] into Equation [5] provides a roadway model for a curved roadway having roadway curvature follows.

$$y(x) = \rho/2x^2 + (\tan(\theta_r) - L \cdot \rho)x + \rho/2 \cdot L^2 - \tan(\theta_r) \cdot L + y_{lr} \quad [8]$$

Equations [7] and [8] illustrate the roadway model for a right side of the vehicle. A roadway model for the left side of the vehicle can be similarly calculated utilizing Equations [7] and [8].

In an exemplary embodiment, the modeled roadway information ahead of the vehicle can include a modeled left edge lane marking of a roadway lane ahead of the vehicle and a modeled right edge lane marking of the roadway lane ahead of the vehicle. Accordingly, the desired positional information module 224 can determine a lane center based on an average between the modeled right and left edge lane markings. In other words, in an exemplary embodiment, the modeled roadway information ahead of the vehicle can include left and right edge lane markings of a lane and a center of the lane. In the exemplary embodiment, the desired positional information module 224 thereby models the roadway ahead of the vehicle based on one of Equations [7] and [8] and determines desired vehicle positional information 238 with respect to the modeled roadway information ahead of the vehicle and based on the determined lane center. The desired vehicle positional information 238 can include a desired vehicle lateral offset $y_{des}$ from the modeled roadway information to the lane center and a desired vehicle heading $\theta_{des}$ with respect to the lane center, i.e., when it is desired that the vehicle maintain a lane center of a modeled lane defined by lane markings. For instance, $y_{des}$ can be determined from the right edge lane markings to the lane center when the vehicle is positioned to the right of the lane center. Likewise, the $y_{des}$ can be determined from the left edge lane markings to the lane center when the vehicle is to the left of the lane center. The desired vehicle positional information 238 may then be provided to the predicted positional information module 222 and the comparison unit 226.

FIGS. 9-12 illustrate a vehicle travelling on a roadway, such as vehicle 10 of FIG. 1, associating estimated forward roadway curvature information, vehicle positional information and vehicle sensor information. Table 2 is provided as a key to FIGS. 9-12 wherein numerically labeled forward roadway curvature information, vehicle positional information and vehicle sensor information and the corresponding symbols and/or descriptions are set forth as follows.

TABLE 2

| MEASUREMENT | MEASUREMENT DESCRIPTION |
|---|---|
| 43 | Modeled lane center based on the modeled roadway, y(x) using Eq. [5] |
| 50 | R - turning radius equal to an inverse of the roadway curvature, 1/$\rho$ |
| 52 | $\rho_{GPS}$ - previously traversed roadway curvature |
| 54 | V - vehicle speed |
| 56 | $v_y$ - vehicle lateral speed |
| 58 | $v_x$ - vehicle longitudinal speed |

TABLE 2-continued

| MEASUREMENT | MEASUREMENT DESCRIPTION |
|---|---|
| 60 | δ - steering angle |
| 62 | $δ_F$ - front wheel steering angle |
| 64 | $δ_R$ - rear wheel steering angle |
| 66 | D - wheel base |
| 68 | r - vehicle yaw rate |
| 70 | θ - one of a desired vehicle heading angle $θ_{des}$ calculated utilizing Equation [5] and a predicted future vehicle heading angle $θ_r$ calculated utilizing Equation [10] |
| 72 | a - distance from the center of gravity of the vehicle to the front axle |
| 74 | b - distance from the center of gravity of the vehicle to the rear axle |
| 75 | γ - one of a desired vehicle lateral offset $γ_{des}$ calculated utilizing Equation [5] and a predicted future vehicle lateral offset $γ_r$ calculated utilizing Equation [10] |
| 82 | $δ_{cmd}$ - steering angle command |
| 80 | $τ_{cmd}$ - torque command |

Figure 9:
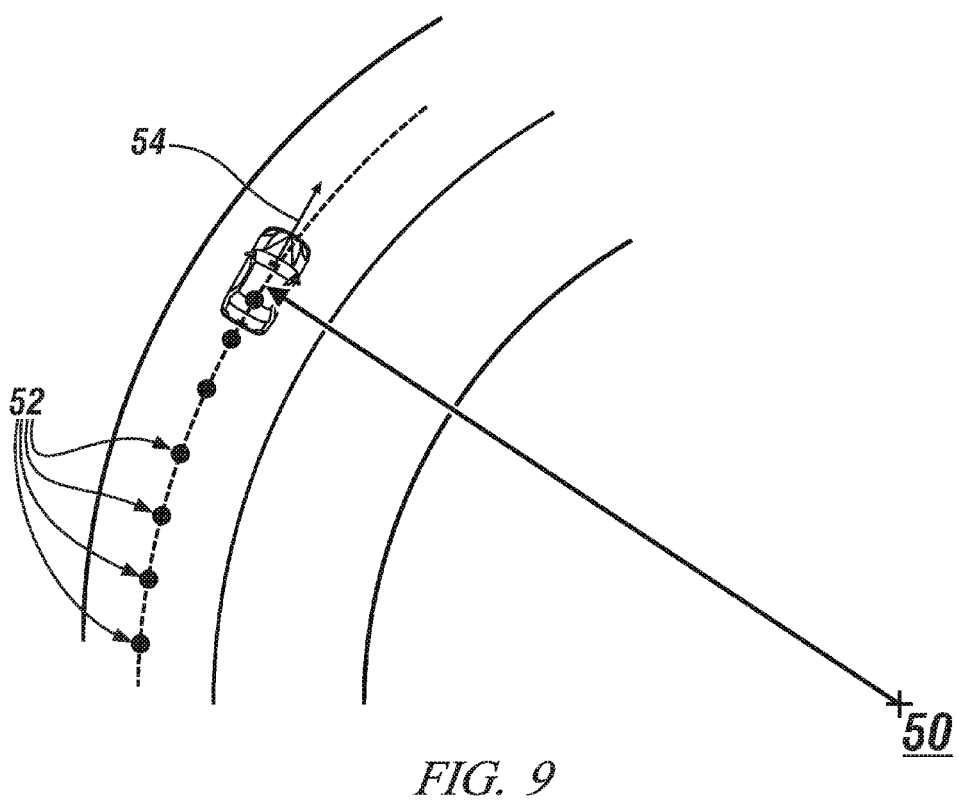
FIGS. 9-12 illustrate the vehicle of FIG. 1 travelling on a roadway, associating estimated forward roadway curvature information, vehicle positional information and vehicle sensor information, in accordance with the present disclosure.
Figure 10:
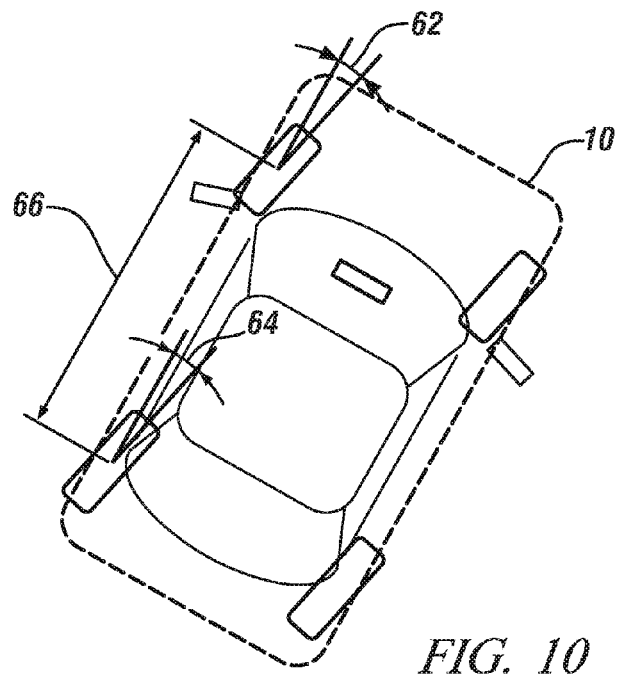

With reference to FIGS. 2, 9 and 10, the forward roadway curvature module 220 can estimate forward roadway curvature ρ 38 that is provided as the estimated forward roadway curvature information 236 to the predicted positional information module 222 and the desired positional information module 224. The estimated forward roadway curvature ρ 38 is based on vehicle sensor information 240 provided by the vehicle sensor module 202 and monitored by the forward roadway curvature module 220. The vehicle sensor information 240 can include vehicle speed V 54, a frontward steering angle $δ_F$ 62, and a rearward steering angle $δ_R$ 64. The forward roadway curvature module 220 can additionally monitor GPS information 242 provided by the GPS module 204. The GPS module can include a GPS device, such as GPS device 145 FIG. 1, and/or a navigational system.

In an exemplary embodiment, estimating forward roadway curvature ρ 38 based on the monitored vehicle sensor information 240 includes tracking previously traversed GPS information 242. The previously traversed GPS information 242 can be provided to the forward roadway curvature module 220. Illustrated in FIG. 9, previously traversed roadway curvature $ρ_{GPS}$ 52 can be determined based on the previously traversed GPS information 242 and plotted over a period of time during vehicle operation. In an alternative embodiment, the previously traversed roadway curvature $ρ_{GPS}$ 52 can be estimated based on vehicle sensor information 240 including vehicle speed, yaw rate, lateral acceleration and steering angles without monitoring the previously traversed GPS information 242. Accordingly, the forward roadway curvature module 220 can estimate the forward roadway curvature (e.g., estimated forward roadway curvature information 236). In the exemplary embodiment, the estimated forward roadway curvature ρ (e.g., ρ 38 shown in FIG. 6 and provided as the estimated forward roadway curvature information 236 shown in FIG. 2) based on the previously traversed roadway curvature $ρ_{GPS}$ and the monitored vehicle sensor information 240 can be estimated as follows:

$$ρ = α \cdot \frac{1/L}{(1 + K_{us}V^2/Lg)}(δ_F - δ_R) + (1 - α) \cdot ρ_{GPS} \quad [9]$$

wherein
$K_{us}$ an under steer coefficient,
ρ is the estimated forward roadway curvature=1/R,
R is a turning radius,
$ρ_{GPS}$ is previously traversed roadway curvature,
g is gravity,
α is a calibration parameter, $0 ≦ α ≦ 1$,
$δ_F$ is a front wheel steer angle, and
$δ_R$ is a rear wheel steer angle.

The forward roadway curvature information 236 including the estimated forward roadway curvature ρ 38 and the estimated forward roadway curvature derivative Δρ 40 is input to the predicted positional information module 222 and the desired positional information module 224. It will be appreciated that Δρ 40 is ρ 38 monitored over a period of time.

In an exemplary embodiment, the predicted positional information module 222 predicts future vehicle positional information 244 with respect to the modeled roadway. It will be appreciated that time delay can be observed within the lane keeping controller 200 due to delays in image processing from the rearward camera module 206, communication and actuator response within the steering module 210. The predicted future vehicle positional information 244 compensates for this time delay by taking vehicle sensor information 244 including vehicle motion parameters into consideration. The predicted positional information module 222 can utilize a differential equation to predict the future vehicle positional information 244 with respect to the modeled roadway (e.g., contained in the desired vehicle positional information 238) based on the vehicle sensor information 240 and the estimated forward roadway curvature information 236 as follows:

$$\dot{x}_r = A_r x_r + B^r δ + G_r ρ \quad [10]$$

wherein δ is the steering angle 60 shown in FIG. 11
The coefficients of Eq. [10] can be expressed as follows:

$$x_r = [y_r \ \varphi_r \ v_y \ r]^T \quad [11]$$

$$A_r = \begin{bmatrix} 0 & v_x & 1 & 0 \\ 0 & 0 & 0 & 1 \\ 0 & 0 & -\dfrac{C_f + C_r}{mv_x} & \dfrac{bC_r - aC_f}{mv_x} - v_x \\ 0 & 0 & \dfrac{bC_r - aC_f}{Iv_x} & \dfrac{a^2C_f - b^2C_r}{Iv_x} \end{bmatrix}$$

$$B_r = \begin{bmatrix} 0 & 0 & \dfrac{C_f}{m} & \dfrac{aC_f}{I} \end{bmatrix}^T$$

$$G_r = [0 \ v_x \ 0 \ 0]^T$$

wherein
$y_r$ is predicted future vehicle lateral offset 75 from the modeled roadway information
$θ_r$ is predicted future vehicle heading angle with respect to the modeled roadway information,
$v_y$ is vehicle lateral speed,
$v_x$ is vehicle longitudinal speed,
R is vehicle yaw rate,
$C_f$ is forward corner stiffness,
$C_r$ is rearward corner stiffness,
m is vehicle mass,
I is vehicle inertia,
a is distance from the center of gravity of the vehicle to the front axle, and
b is distance from the center of gravity of the vehicle to the rear axle.

Figure 11:
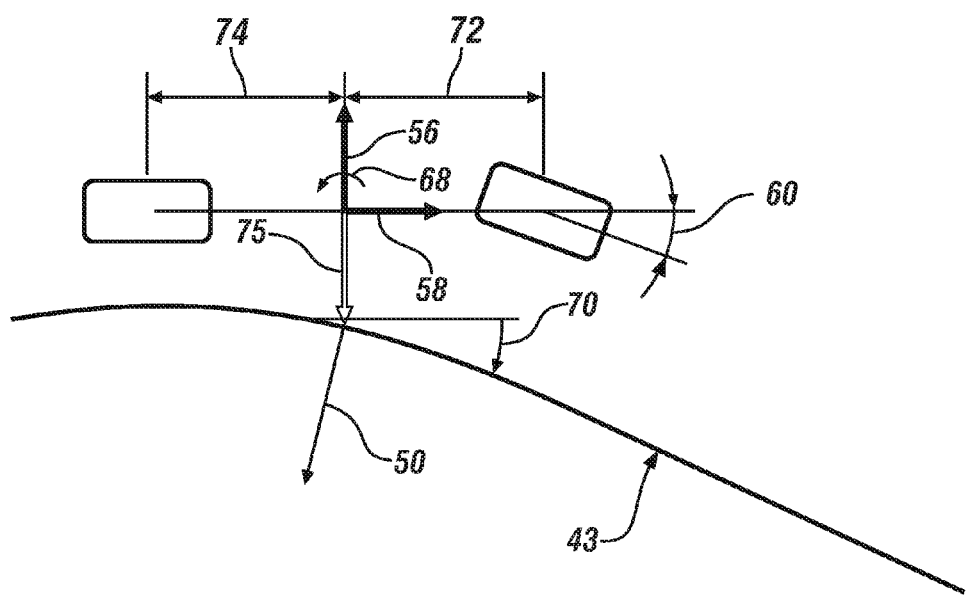
Figure 12:
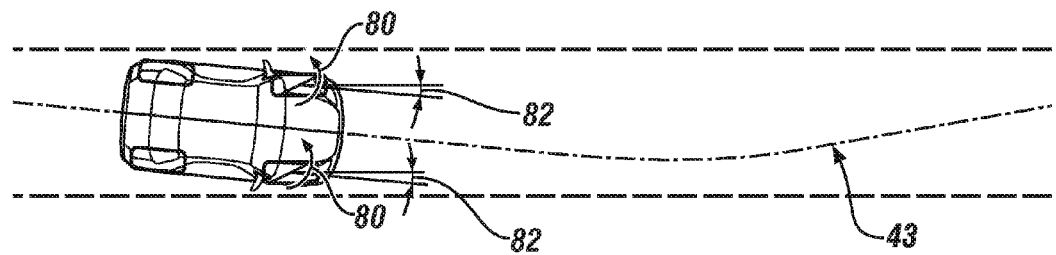

With reference to FIGS. 2 and 11, the predicted positional information module 222 monitors the vehicle sensor information including vehicle speed V 54, a vehicle raw rate r 68, the steering angle δ 60, rearward corner stiffness $C_r$ and forward corner stiffness $C_f$. Vehicle longitudinal speed $v_x$ 58 and vehicle lateral speed $v_y$ 56 can be determined based on the vehicle speed V 54. The differential Equation [10] predicts the future vehicle positional information 244 with respect to the modeled roadway information based 238 on the vehicle yaw rate r 68, the steering angle δ 60, the rearward corner stiffness $C_r$, the forward corner stiffness $C_f$, the vehicle longitudinal speed $v_x$ 58 and the vehicle lateral speed $v_y$ 56.

As aforementioned, the modeled roadway information 238 can include a modeled left edge lane marking of a roadway lane ahead of the vehicle and a modeled right edge lane marking of the roadway lane ahead of the vehicle. The modeled roadway information 238 can include a lane center determined based on the average between the modeled left and right edge lane markings. The predicted future vehicle positional information 244 can include a predicted future vehicle lateral offset $y_r$ from the modeled roadway information. For instance, the $y_r$ can be determined from the right edge lane markings when the vehicle is to the right of the lane center. Likewise, the $y_r$ can be determined from the left edge lane markings when the vehicle is to the left of the lane center. The predicted future vehicle positional information 244 can further include a predicted future vehicle heading angle $θ_r$ with respect to the determined lane center. The predicted future vehicle positional information 244 may be provided to the comparison unit 226 and compared with the desired vehicle positional information 238.

In the exemplary embodiment, the desired vehicle positional information 238 and the predicted future vehicle positional information 244 are compared within the comparison unit 226. A deviation 246 in the predicted future vehicle positional information 244 from the desired vehicle positional information 238 be determined based on the comparing. The deviation 246 can include a vehicle lateral offset error $y_{err}$ between the desired vehicle lateral offset $y_{des}$ and the predicted future vehicle lateral offset $y_r$. The deviation 246 can further include a vehicle heading angle error $θ_{err}$ between the desired vehicle heading angle $θ_{des}$ and the predicted future vehicle heading angle $θ_r$. The error information 246 is provided to the steering command module 228.

The steering command module 246 thereby generates a steering command 248 based on the deviation 246. Specifically, the steering command 248 is generated based on the deviation in the predicted future vehicle positional information from the desired vehicle positional information to converge the predicted future vehicle positional information toward the desired vehicle positional information. The steering command 248 can be input to the steering module 210 to calculate a steering angle command $δ_{cmd}$ 82 to control the vehicle over a predetermined period of time to converge the predicted future vehicle positional information toward the desired vehicle positional information and thereby maintain the desired vehicle positional information, i.e., maintain the lane center on the roadway lane.

The steering angle command $δ_{cmd}$ 82 can be expressed as a function over time expressed as follows:

$$J = \int_0^{\Delta T} \left\{ [y \quad \varphi]_{err} \cdot Q(t) \cdot \begin{bmatrix} y \\ \varphi \end{bmatrix}_{err} + δ_{front} \cdot R(t) \cdot δ_{front} \right\} dt \quad [12]$$

wherein
 $y_{err}$ is vehicle lateral offset error,
 $\phi_{err}$ is vehicle heading error,
 $δ_{cmd}$ is steering angle command,
 Q(t) is weighted factor, and
 R(t) is weighted factor.

The vehicle lateral offset error $y_{err}$ can be expressed as follows.

$$y_{err} = y_{des} - y_r \quad [13]$$

And, the vehicle heading error can be expressed as follows.

$$θ_{err} = θ_{des} - θ_r \quad [14]$$

It will be appreciated that instances can occur when the lane keeping system may not accept a steering angle command $δ_{cmd}$ 82. Accordingly, the steering module 210 can calculate at least one of a differential torque command to a driveline of the vehicle based on the steering command and a differential braking command to the driveline of the vehicle based on the steering command. Accordingly, the vehicle can be controlled based on the generated steering command 248 over the predetermined period of time to converge the predicted future vehicle positional information toward the desired vehicle positional information. The predetermined period of time can be calibrated such that control of the vehicle to converge the vehicle is not accomplished too abruptly to cause the driver discomfort or objection.

Figure 13:
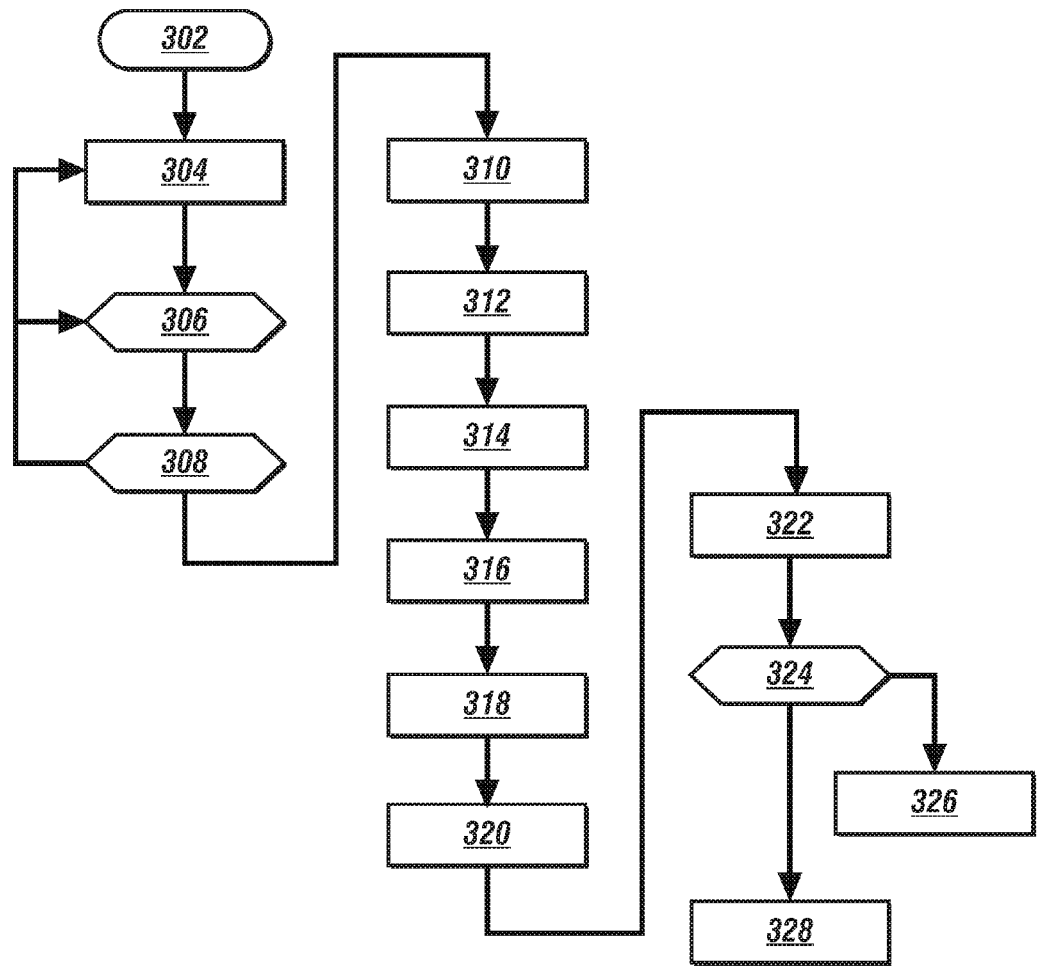
FIG. 13 illustrates a flow chart for controlling an autonomous or semi-autonomous vehicle to maintain a desired position on a roadway based on monitored roadway information behind the vehicle using a rearward detection, in accordance with the present disclosure.

In an exemplary embodiment, FIG. 13 illustrates a flow chart 300 for controlling an autonomous or semi-autonomous vehicle to maintain a desired position on a roadway utilizing the lane keeping system of FIG. 1 and the LKC 200 of FIG. 2 in accordance with the present disclosure. Table 3 is provided as a key to FIG. 13 wherein the numerically labeled blocks and the corresponding functions are set forth as follows.

TABLE 3

| MEASUREMENT | MEASUREMENT DESCRIPTION |
|---|---|
| 302 | Start. |
| 304 | Lane keeping disengaged. |
| 306 | Is roadway information is capable of being monitored (i.e., is a rearward detection device available)? |
| 308 | Is vehicle steering system available? |
| 310 | Engage lane keeping. |
| 312 | Monitor roadway information behind the vehicle using a rearward detection device and monitoring vehicle sensor information. |
| 314 | Project frontward positional information based on rearward positional information obtained from the monitored roadway information behind the vehicle. |
| 316 | Estimate forward roadway curvature based on the monitored vehicle sensor information and model roadway information ahead of the vehicle based on the projected vehicle positional information and the restimated forward roadway curvature. |
| 318 | Determine desired vehicle positional information with respect to the modeled roadway information. |
| 320 | Predict future vehicle positional information with respect to the modeled roadway information based on the monitored vehicle sensor information and the estimated forward roadway curvature. |
| 322 | Calculate a steering angle command ($δ_{cmd}$). |
| 324 | Does the steering system accept $δ_{cmd}$? |
| 326 | Calculate the torque command ($τ_{cmd}$). |
| 328 | Send $δ_{cmd}$ to the steering system. |

The flowchart 300 utilizes the aforementioned lane keeping system including the lane keeping system manager 110 of FIG. 1 and the LKS 200 of FIG. 2. The flowchart 300 starts at block 302 and proceeds block 304 where the lane keeping system determines that the lane keeping system is currently disengaged. The flowchart proceeds to decision block 306 where it is determined whether roadway information behind the vehicle is capable of being monitored (i.e., is a rearward detection device available). If roadway information behind the vehicle is not capable of being monitored, the flowchart proceeds back to block 304. If roadway information is capable of being monitored, the flowchart 300 proceeds to decision block 308. Decision block 308 determines if the vehicle steering system is available. If the steering system is not available, the flowchart 300 proceeds back to block 304. If the steering system is available, the flowchart 300 proceeds to block 310 where lane keeping is engaged.

Block 312 monitors roadway information behind the vehicle using a rearward detection device, such as rearward camera 1 of FIG. 1, and monitoring vehicle sensor information. The vehicle sensor information can be accessed from the vehicle sensor module 202 of FIG. 2. Block 314 projects frontward positional information based on rearward positional information obtained from the monitored roadway information behind the vehicle before proceeding to block 316. Block 316 estimates forward roadway curvature based on the monitored vehicle sensor information and models roadway information ahead of the vehicle based on the projected vehicle positional information and the estimated forward roadway curvature. It will be appreciated that the roadway information ahead of the vehicle can be modeled utilizing Equation [5]. Block 318 determines desired vehicle positional information (e.g., a desired vehicle lateral offset and a desired vehicle heading angle) with respect to the modeled roadway information.

Block 320 predicts future vehicle positional information (e.g., a predicted future vehicle lateral offset and a predicted future vehicle heading angle) with respect to the modeled roadway information based on the monitored vehicle sensor information and the estimated forward roadway curvature. The vehicle sensor information can include vehicle motion information monitored by in-vehicle sensors. Block 322 can calculate a steering angle command $\delta_{cmd}$ based on a steering command. The steering command can be generated based on a deviation in the predicted future vehicle positional information from the desired vehicle positional information. Decision block 324 determines whether the steering system will accept $\delta_{cmd}$. If the steering system will accept $\delta_{cmd}$, the flowchart 300 proceeds to block 328 where $\delta_{cmd}$ is provided to the steering system to control the vehicle over a predetermined period of time to converge the predicted future vehicle positional information toward the desired vehicle positional information. If the steering system will not accept $\delta_{cmd}$, the flowchart 300 proceeds to block 326 where a torque command $\tau_{cmd}$ is calculated based on the steering command. The $\tau_{cmd}$ can include a differential torque command to a driveline of the vehicle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a vehicle to maintain a desired position on a roadway, comprising:
monitoring roadway information behind the vehicle using a rearward detection device;
monitoring vehicle sensor information;
projecting frontward positional information employing a frontward positional information module and based on rearward positional information obtained from the monitored roadway information behind the vehicle, wherein projecting the frontward positional information based on rearward positional information obtained from the monitored roadway information behind the vehicle comprises:
obtaining a vehicle rearward lateral offset from the monitored roadway information and a vehicle rearward heading angle with respect to the monitored roadway information,
applying geometric relationships to the obtained vehicle rearward lateral offset and the vehicle rearward heading angle to compensate for geometric delay, and
projecting a vehicle frontward lateral offset from frontward roadway information and a vehicle frontward heading angle with respect to frontward roadway information based on the geometric relationships applied to the obtained vehicle rearward lateral offset and the vehicle rearward heading angle;
estimating forward roadway curvature based on the monitored vehicle sensor information;
modeling roadway information ahead of the vehicle based on the projected frontward positional information and the estimated forward roadway curvature to determine desired vehicle positional information with respect to the modeled roadway information;
predicting future vehicle positional information with respect to the modeled roadway information based on the monitored vehicle sensor information and the estimated forward roadway curvature;
comparing the desired vehicle positional information to the predicted future vehicle positional information; and
generating a steering command based on a deviation in the predicted future vehicle positional information from the desired vehicle positional information to converge the predicted future vehicle positional information toward the desired vehicle positional information.

2. The method of claim 1 wherein the rearward detection device comprises a rearward camera.

3. The method of claim 1 wherein the rearward detection device comprises at least one of a rearward camera, a rearward lidar device, a rearward laser device, a rearward radar device, vehicle-to-vehicle information, a GPS device in conjunction with a 3D map database and vehicle-to-infrastructure information.

4. The method of claim 1 wherein monitored roadway information behind the vehicle comprises:
a left edge lane marking of a roadway lane behind the vehicle; and
a right edge lane marking of the roadway lane behind the vehicle.

5. The method of claim 1 wherein when the monitored roadway information indicates no roadway curvature, the projected vehicle frontward lateral offset is based on a tangent of the vehicle rearward heading angle, a longitudinal offset of the rearward detection device from a vehicle center and the vehicle rearward lateral offset, and the projected vehicle frontward heading angle is equal to the vehicle rearward heading angle.

6. The method of claim 1 wherein when the monitored roadway information indicates no roadway curvature, the projected vehicle frontward lateral offset is based on a tangent of the vehicle rearward heading angle, a longitudinal offset of the rearward detection device from a vehicle center, the vehicle rearward lateral offset and the estimated forward roadway curvature, and the projected vehicle frontward heading angle is based on the vehicle rearward heading angle, a cotangent of the longitudinal offset of the rearward detection device from the vehicle center and a cotangent of the estimated forward roadway curvature.

7. The method of claim 1 wherein estimating the forward roadway curvature based on the monitored vehicle sensor information comprises estimating the forward roadway curvature based on vehicle speed, vehicle yaw rate, lateral acceleration, a frontward steering angle and a rearward steering angle.

8. The method of claim 1 wherein estimating the forward roadway curvature based on the monitored vehicle sensor information comprises:
tracking previously traversed GPS information;
determining previously traversed roadway curvature based on the previously traversed GPS information; and
estimating the forward roadway curvature based on the previously traversed roadway curvature and the monitored vehicle sensor information.

9. The method of claim 8 wherein the monitored vehicle sensor information comprises vehicle speed, a frontward steering angle, and a rearward steering angle.

10. The method of claim 1 wherein modeling the roadway information ahead of the vehicle based on the projected frontward positional information and the estimated forward roadway curvature to determine the desired vehicle positional information with respect to the modeled roadway information comprises:
utilizing a polynomial to model the roadway information ahead of the vehicle based on the projected positional information and the estimated forward roadway curvature, said modeled roadway information comprising
a modeled left edge lane marking of a roadway lane ahead of the vehicle, and
a modeled right edge lane marking of the roadway lane ahead of the vehicle;
determining a lane center based on an average between the modeled right and left edge lane markings; and
determining the desired vehicle positional information with respect to the modeled roadway information based on the determined lane center.

11. The method of claim 10 wherein the desired vehicle positional information with respect to the modeled roadway information based on the determined lane center comprises a desired vehicle lateral offset from the modeled roadway information to the lane center and a desired vehicle heading with respect to the lane center.

12. The method of claim 1 wherein predicting the future vehicle positional information with respect to the modeled roadway information based on the monitored vehicle sensor information and the estimated forward roadway curvature comprises:
monitoring the vehicle sensor information including vehicle speed, a vehicle yaw rate, a steering angle, rearward corner stiffness and forward corner stiffness;
determining vehicle longitudinal speed and vehicle lateral speed based on the vehicle speed; and
utilizing a differential equation to predict the future vehicle positional information with respect to the modeled roadway information based on the vehicle yaw rate, the steering angle, the rearward corner stiffness, the forward corner stiffness, the vehicle longitudinal speed and the vehicle lateral speed.

13. The method of claim 12 wherein the modeled roadway information comprises a modeled left edge lane marking of a roadway lane ahead of the vehicle and a modeled right edge lane marking of the roadway lane ahead of the vehicle, the method further comprising:
determining a lane center based on an average between the modeled left and right edge lane markings; and
predicting the future vehicle positional information with respect to the modeled roadway information, the predicted future vehicle positional information comprising a future vehicle lateral offset from the modeled roadway information and a future vehicle heading angle with respect to the lane center.

14. The method of claim 1 wherein generating the steering command comprises:
calculating a steering angle command based on the steering command.

15. The method of claim 1 wherein generating the steering command comprises at least one of:
calculating a differential torque command to a driveline of the vehicle based on the steering command; and
calculating a differential braking command to a driveline of the vehicle based on the steering command.

16. The method of claim 1 further comprising:
controlling the vehicle based on the generated steering command over a predetermined period of time to converge the predicted future vehicle positional information toward the desired vehicle positional information.

17. Method for controlling a vehicle to maintain a desired position on a roadway, comprising:
monitoring roadway information behind the vehicle using a rearward camera;
monitoring vehicle sensor information;
projecting frontward positional information employing frontward positional information module based on rearward positional information obtained from the monitored roadway information behind the vehicle, comprising
obtaining a vehicle rearward lateral offset from the monitored roadway information and a vehicle rearward heading angle with respect to the monitored roadway information,
applying geometric relationships to the obtained vehicle rearward lateral offset and the vehicle rearward heading angle to compensate for geometric delay, and
projecting a vehicle frontward lateral offset from frontward roadway information and a vehicle frontward heading angle with respect to frontward roadway information based on the geometric and kinematics relationships applied to the obtained vehicle rearward lateral offset and the vehicle rearward heading angle;
estimating forward roadway curvature based on the monitored vehicle sensor information, comprising
tracking previously traversed GPS information,
determining previously traversed roadway curvature based on the previously traversed GPS information, and
estimating the forward roadway curvature based on the previously traversed roadway curvature and the monitored vehicle sensor information;
modeling roadway information ahead of the vehicle based on the projected frontward positional information and the estimated forward roadway curvature to determine desired vehicle positional information with respect to the modeled roadway information;
predicting future vehicle positional information with respect to the modeled roadway information based on the monitored vehicle sensor information and the estimated forward roadway curvature;
comparing the desired vehicle positional information to the predicted future vehicle positional information; and
generating a steering command based on a deviation in the predicted future vehicle positional information from the desired vehicle positional information to converge the predicted future vehicle positional information toward the desired vehicle positional information.

18. The method of claim 17 wherein monitored roadway information behind the vehicle comprises:

a left edge lane marking of a roadway lane behind the vehicle; and a right edge lane marking of the roadway lane behind the vehicle.

19. Apparatus for autonomously controlling a vehicle to maintain a desired position on a roadway, comprising:
- a plurality of vehicle sensors;
- a rearward detection device;
- a steering module; and a
- lane keeping control module configured to:
    - monitor roadway information behind the vehicle using the rearward detection device,
    - monitor vehicle sensor information from the plurality of vehicle sensors,
    - project frontward positional information based on rearward positional information obtained from the monitored roadway information behind the vehicle,
    - estimate forward roadway curvature based on the monitored vehicle sensor information,
    - model roadway information ahead of the vehicle based on the projected frontward positional information and the estimated forward roadway curvature to determine desired vehicle positional information with respect to the modeled roadway information,
    - predict future vehicle positional information with respect to the modeled roadway information based on the monitored vehicle sensor information and the estimated forward roadway curvature,
    - compare the desired vehicle positional information to the predicted future vehicle positional information, and
    - generate a steering command based on a deviation in the predicted future vehicle positional information from the desired vehicle positional information to converge the predicted future vehicle positional information toward the desired vehicle positional information.

* * * * *